(12) United States Patent
Yang

(10) Patent No.: US 10,699,117 B2
(45) Date of Patent: Jun. 30, 2020

(54) PUPIL POSITIONING DEVICE AND METHOD AND DISPLAY DRIVER OF VIRTUAL REALITY DEVICE

(71) Applicant: BOE Technology Group Co., Ltd., Beijing (CN)

(72) Inventor: Quan Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 123 days.

(21) Appl. No.: 15/989,658

(22) Filed: May 25, 2018

(65) Prior Publication Data

US 2019/0147216 A1     May 16, 2019

(30) Foreign Application Priority Data

Nov. 13, 2017    (CN) .......................... 2017 1 1115442

(51) Int. Cl.

| | |
|---|---|
| *G06T 7/73* | (2017.01) |
| *G06T 1/60* | (2006.01) |
| *G06K 9/46* | (2006.01) |
| *G06T 5/30* | (2006.01) |
| *G06K 9/00* | (2006.01) |
| *G06F 3/01* | (2006.01) |

(52) U.S. Cl.
CPC ........... *G06K 9/0061* (2013.01); *G06F 3/013* (2013.01); *G06K 9/4638* (2013.01); *G06T 1/60* (2013.01); *G06T 7/73* (2017.01); *G06T 2207/30201* (2013.01)

(58) Field of Classification Search
USPC ....... 345/418–645, 651–656; 348/47–50, 77, 348/78, 169–172, 208.14, 208.16, 348/218.1–224.1; 382/162–227, 254–258, 382/276–309
See application file for complete search history.

(56) References Cited

U.S. PATENT DOCUMENTS

| | | | |
|---|---|---|---|
| 7,088,457 B1 | 8/2006 | Zou et al. | |
| 2006/0147094 A1* | 7/2006 | Yoo | ..................... G06K 9/00604 382/117 |

(Continued)

FOREIGN PATENT DOCUMENTS

| | | |
|---|---|---|
| CN | 101359365 A | 2/2009 |
| CN | 102043954 A | 5/2011 |

(Continued)

OTHER PUBLICATIONS

First Office Action, including Search Report, for Chinese Patent Application No. 201711115442.0, dated Aug. 29, 2019, 16 pages.

*Primary Examiner* — Marcellus J Augustin
(74) *Attorney, Agent, or Firm* — Westman, Champlin & Koehler, P.A.

(57) ABSTRACT

The present disclosure relates to a pupil positioning device and method and a display driver of a virtual reality device. The pupil positioning device includes a preprocessing circuit and a coordinate processing circuit. The preprocessing circuit is configured to receive an eye image, and preprocess the eye image to obtain all boundary points of the eye image. The coordinate processing circuit is configured to perform connected region processing on all the boundary points, and determine coordinates of a center of the pupil according to the maximum connected region.

16 Claims, 5 Drawing Sheets

(56) References Cited

U.S. PATENT DOCUMENTS

| | | | |
|---|---|---|---|
| 2011/0013007 A1* | 1/2011 | Holmberg | A61B 3/113 |
| | | | 348/78 |
| 2018/0004305 A1* | 1/2018 | Moseley | G06F 3/0338 |
| 2019/0121427 A1* | 4/2019 | Qin | G06F 3/013 |
| 2019/0294258 A1* | 9/2019 | Forlines | G06F 3/0234 |

FOREIGN PATENT DOCUMENTS

| | | |
|---|---|---|
| CN | 103854011 A | 6/2014 |
| CN | 104463159 A | 3/2015 |
| CN | 106022315 A | 10/2016 |
| CN | 106774862 A | 5/2017 |

* cited by examiner

| 1 | 2 | 1 |
|---|---|---|
| 2 | 4 | 2 |
| 1 | 2 | 1 |

|   | 1 |   |
|---|---|---|
| 3 | A | 4 |
|   | 2 |   |

| 8 | 7 | 6 |
|---|---|---|
| 1 | A | 5 |
| 2 | 3 | 4 |
Fig. 7
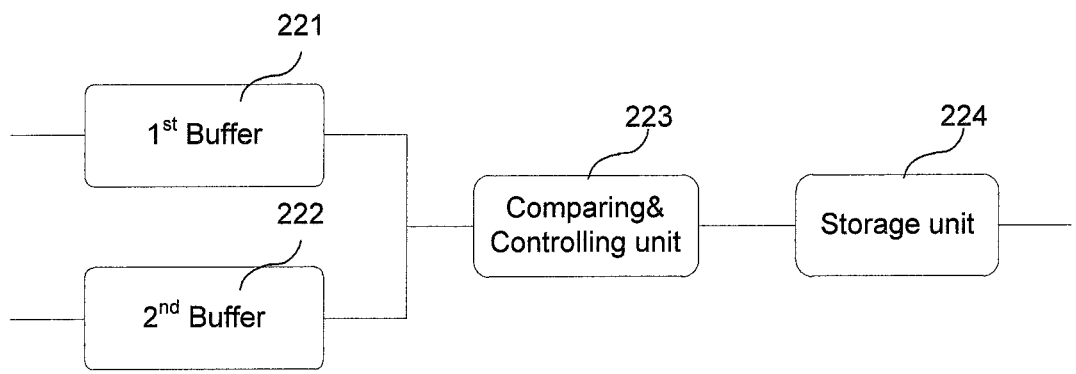
Fig. 8
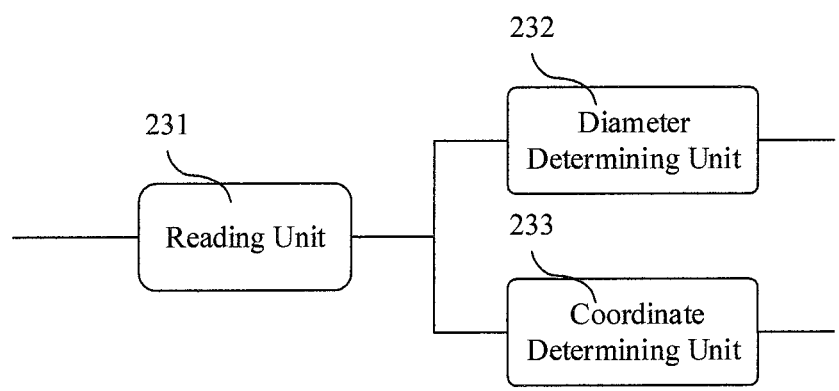
Fig. 9

PUPIL POSITIONING DEVICE AND METHOD AND DISPLAY DRIVER OF VIRTUAL REALITY DEVICE

CROSS REFERENCE

The present disclosure claims a benefit from Chinese Patent Application No. 201711115442.0 filed on Nov. 13, 2017 and titled "PUPIL POSITIONING DEVICE AND METHOD AND DISPLAY DRIVER OF VIRTUAL REALITY DEVICE", which is incorporated here by reference in its entirety.

TECHNICAL FIELD

The present disclosure relates to the eye control technology, in particular to a pupil positioning device and method and a display driver of a virtual reality device.

BACKGROUND

In recent years, Virtual Reality (VR)/Augmented Reality (AR) technology has been gradually applied to the fields of display, games and medical applications. With the development of technology, people want more and more from VR/AR. They no longer satisfy with product experiences brought by the interaction that relies on rotating the head to change perspectives. Therefore, many manufacturers are accelerating the application of eye tracking technology to VR/AR area.

SUMMARY

According to the embodiments of the present disclosure, a pupil positioning device and method and a display driver of a virtual reality device are provided, capable of at least partly solving the technical problems of the conventional pupil positioning devices that involve a high producing cost and slow processing.

In a first aspect of the embodiments of the present disclosure, a pupil positioning device is provided. The pupil positioning device includes: a preprocessing circuit configured to receive an eye image, and preprocess the eye image to obtain all boundary points of the eye image, so as to reduce an amount of data to be processed; and a coordinate processing circuit configured to perform connected region processing on all the boundary points, and determine coordinates of a center of the pupil according to the maximum connected region.

Optionally, the preprocessing circuit includes: a first buffer configured to buffer the $i^{th}$ row of data in the eye image during the $i^{th}$ buffer period, and transmit the $i^{th}$ row of data to a processing circuit during the $i+1^{th}$ buffer period, wherein $i=1, \ldots, N-1$, and N is the number of pixel rows in the eye image; a second buffer configured to buffer the $i+1^{th}$ row of data in the eye image during the $i+1^{th}$ buffer period, and transmit the $i+1^{th}$ row of data to the processing circuit during the $i+2^{th}$ buffer period; the processing circuit configured to preprocess the data to obtain and transmit boundary points of the data to a storage circuit; and the storage circuit configured to store all the boundary points of the eye image.

Optionally, the first buffer and the second buffer each includes a dual-port random access memory RAM, and the processing circuit includes a circuit composed of a RAM read-write controller, a comparator and a counter or comprises a field programmable gate array FPGA.

Optionally, the processing circuit includes: a grayscale conversion unit for performing grayscale conversion processing on the data; a filtering unit for performing filtering processing on the data after the grayscale conversion processing; a binarization unit for performing binarization processing on the data after the filtering processing; a boundary unit for performing boundary erosion and dilation processing on the data after the binarization processing; and a boundary extraction unit for performing boundary extraction processing on the data after the boundary erosion and dilation processing.

Optionally, the filtering unit performs Gaussian filtering by using a 3*3 template, and the boundary extraction unit performs the boundary extraction by using a four-neighborhood method.

Optionally, the processing circuit further includes a clipping unit for clipping the eye image.

Optionally, the coordinate processing circuit includes: a region determining circuit for determining all the connected regions according to all the boundary points of the eye image; a region comparing circuit for comparing sizes of all the connected regions to determine the maximum connected region; and a coordinate determining circuit for determining the coordinates of the center of the pupil according to the maximum connected region.

Optionally, the region determining circuit is adapted to read all the boundary points from the preprocessing circuit, determine all the connected regions by using an eight-neighborhood method, and store coordinates of boundary points of all the connected regions.

Optionally, the region comparing circuit includes: a first buffer for reading, from the region determining circuit, coordinates of boundary points of the $j^{th}$ connected region, and counting the number Mj of the coordinates of the boundary points of the $j^{th}$ connected region, wherein $j=1, \ldots, M-1$, and M is the number of the connected regions; a second buffer for reading, from the region determining circuit, coordinates of boundary points of the $j+1^{th}$ connected region, and counting the number Mj+1 of the coordinates of the boundary points of the $j+1^{th}$ connected region; a comparing and controlling unit for comparing Mj and Mj+1; when Mj<Mj+1, controlling the first buffer to read the coordinates of the boundary points of another connected region and performing the comparing again; and when Mj>Mj+1, controlling the second buffer to read the coordinates of the boundary points of another connected region and performing the comparing again; and a storage unit for storing coordinates of boundary points of the maximum connected region output by the comparing and controlling unit.

Optionally, the coordinate determining circuit includes: a reading unit for reading, from the region comparing circuit, the coordinates of the boundary points of the maximum connected region; a diameter determining unit for traversing coordinates of all the boundary points to obtain the minimum abscissa, the maximum abscissa, the minimum ordinate and the maximum ordinate, and determining a double diameter of the maximum connected region; and a coordinate determining unit for selecting P boundary points from all the boundary points, and determining the coordinates of a center of the maximum connected region by using an ellipse fitting method as the coordinates of the center of the pupil, wherein P=6, 7, 8, 9 or 10.

Optionally, the coordinate determining unit is adapted to count the number S of the coordinates of all the boundary points, select, starting from a boundary point, one boundary point every [S/P] boundary points, and determine the coordinates of the center of the maximum connected region based on coordinates of the P boundary points by using the ellipse fitting method, as the coordinates of the center of the pupil.

In a second aspect of the embodiments of the present disclosure, a display driver of a virtual reality device is provided. The display driver includes the pupil positioning device as mentioned beforehand.

In a third aspect of the embodiments of the present disclosure, a pupil positioning method is provided. The pupil positioning method includes: receiving an eye image, and preprocessing the eye image to obtain all boundary points of the eye image so as to reduce an amount of data to be processed; performing connected region processing on all the boundary points, and determining coordinates of a center of the pupil according to the maximum connected region.

Optionally, the step of receiving an eye image and preprocessing the eye image to obtain all boundary points of the eye image so as to reduce an amount of data to be processed includes: buffering two rows of data in the eye image by using two dual-port random access memory RAMs, respectively, and preprocessing the data by means of a ping-pong operation to obtain all the boundary points of the eye image.

Optionally, the step of preprocessing the data includes: grayscale conversion processing, filtering processing, binarization processing, boundary erosion and dilation processing, and boundary extraction processing.

Optionally, the step of preprocessing the data further includes clipping the eye image.

Optionally, the step of performing connected region processing on all the boundary points and determining coordinates of a center of the pupil according to the maximum connected region includes: determining all the connected regions according to all the boundary points of the eye image by using an eight-neighborhood method; comparing sizes of all the connected regions to determine the maximum connected region; and determining the coordinates of the center of the pupil according to the maximum connected region.

Optionally, the step of comparing sizes of all the connected regions to determine the maximum connected region includes: reading coordinates of boundary points of two connected regions by using two dual-port random access memory RAMs, respectively, and counting and comparing the numbers of the coordinates of the boundary points of the two connected regions; controlling the RAM having the smaller number of coordinates of boundary points to read coordinates of boundary points of another connected region and performing the comparing again until all the connected regions are traversed, and determining a connected region having the largest number of coordinates of boundary points as the maximum connected region.

Optionally, the step of determining the coordinates of a center of the pupil according to the maximum connected region includes: reading coordinates of boundary points of the maximum connected region in sequence, comparing every two coordinates to obtain the minimum abscissa, the maximum abscissa, the minimum ordinate and the maximum ordinate, and determining a double diameter of the maximum connected region; and selecting P boundary points from all the boundary points, and determining the coordinates of the center of the maximum connected region by using an ellipse fitting method as the coordinates of the center of the pupil, wherein P=6, 7, 8, 9 or 10.

Optionally, the step of selecting P boundary points from all the boundary points includes: counting the number S of the coordinates of all the boundary points, and selecting, starting from a boundary point, one boundary point every [S/P] boundary points.

BRIEF DESCRIPTION OF THE DRAWINGS

The figures, which constitute a part of the description, are provided for facilitating further understanding of the present disclosure in conjunction with the embodiments, rather than limiting the present disclosure. In the figures:

FIG. 7 is a schematic diagram showing an eight-neighborhood method according to an embodiment of the present disclosure;

FIG. 8 is a schematic diagram showing a structure of a region comparing circuit according to an embodiment of the present disclosure;

FIG. 9 is a schematic diagram showing a structure of a coordinate determining circuit according to an embodiment of the present disclosure.

DETAILED DESCRIPTION

Figure 1:
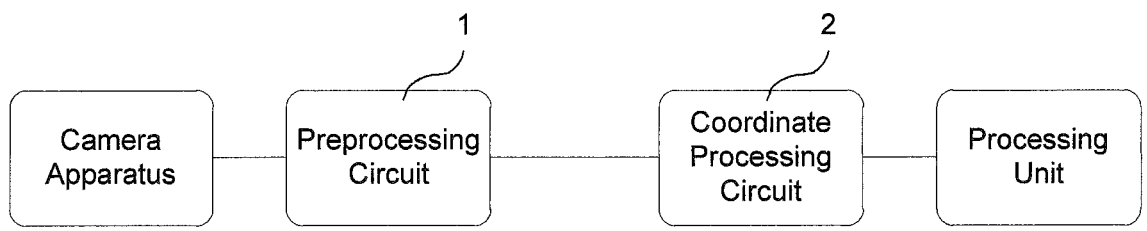
FIG. 1 is a schematic diagram showing a structure of a pupil positioning device according to an embodiment of the present disclosure.

In the following, the embodiments of the present disclosure will be described in further detail with reference to the figures. It is to be noted that the embodiments described below are illustrative only, rather than limiting the scope of the present disclosure. It is to be further noted that, in the case of no conflict, the embodiments of the present disclosure and features in the embodiments may be arbitrarily combined with each other.

The Eye Tracking technology is an intelligent human-machine interaction technology that uses the eye movement to control machine. It can complete all operations just with the eye "look", thereby not only liberating both hands, but also leading to the quickest and the most humane control method. Hence, the eye tracking technology, as an important part of enhancing the experience of VR/AR products, not only can meet the demand of high-definition rendering but also can greatly enhance the interactive experience of VR devices. By interacting with the VR user interface through eyes, users can control menus directly and then trigger operation, without unnatural head operations.

The inventor of the present disclosure found that the existing head-mounted VR/AR products that support eye tracking need to be equipped with a computer device and then use a processing unit (such as a CPU) of the computer device to perform pupil positioning. This not only leads to a higher producing cost, but also involves slower processing and an obvious display delay, which may influence the user experience and restrict the marketing.

The eye tracking technology is based on image processing. Specifically, the eye tracking technology captures images of an eye in real time by a camera apparatus (such as a CCD camera) installed in front of the eye, obtains coordinates of a center of the pupil by means of image processing, and then takes a purkinje image formed on the cornea of the eye as a reference point. When the eyeball gazes at different positions, the nearly spherical eyeball rotates while the purkinje image remains still. So, the position at which the eye's current sight falls on a display screen in front of the eye can be calculated, by using the relationship between coordinates of the center of the pupil and coordinates of the purkinje image, and then the display screen can be operated, thereby achieving human-machine interaction or gazing point rendering and the other functions. Thus, it is the basis of eye tracking technology to precisely position the pupil. At present, the conventional pupil positioning method usually involves that the camera apparatus captures an eye image and sends it to a processing unit. At least one frame of data in the eye image is buffered in the processing unit, and an image of the pupil is then obtained through traversal and calculation of pixel by pixel. A contour of the pupil is obtained by performing boundary extraction on the image of the pupil, and coordinates of the center of the pupil may be obtained according to the contour of the pupil.

The inventors of the present application have found from researches that the conventional pupil positioning methods need to traverse an entire frame of the image and the $n^{th}$ row of data needs to be determined on a per-row basis in combination with the $n-1^{th}$, $n-2^{th}$, ..., $2^{nd}$ and $1^{st}$ rows of data, resulting in a high computational load and thus a low processing speed (typically longer than 4 ms). The processing cannot be done within a blanking period during which a camera apparatus outputs an eye image. For example, when a camera apparatus samples an eye image at 120 Hz and outputs it in real-time, if the eye image is collected at the $N^{th}$ frame, with the conventional processing method the coordinates of the center of the pupil can only be mapped to the $N+3^{th}$ or $N+4^{th}$ frame, such that the user will perceive a deviation of the coordinates of the line of sight. Meanwhile, since the conventional pupil positioning method needs to buffer at least one frame of eye image data and has a high computational load, its hardware implementation requires excessive storage and logical resources, leading to a high cost, high power consumption (even to an unacceptable extent) and a delay problem as well.

In order to solve the technical problems of the conventional pupil positioning technology which involves a high producing cost and slow processing, the embodiments of the present disclosure provide a hardware implemented pupil positioning device and method and a display driver of a head mounted virtual reality device.

FIG. 1 is a schematic diagram showing a structure of a pupil positioning device according to an embodiment of the present disclosure. As shown in FIG. 1, the pupil positioning device implemented based on hardware mainly includes a preprocessing circuit 1 and a coordinate processing circuit 2, for use during transmission of an eye image from a camera apparatus to a processing unit. The preprocessing circuit 1 receives an eye image from a camera apparatus which captures the eye image, and preprocesses the eye image to obtain all boundary points of the eye image, so as to reduce an amount of data to be processed. The coordinate processing circuit 2 performs connected region processing on all the boundary points, determines coordinates of the center of the pupil according to the maximum connected region, and transmits the determined coordinates of the center of the pupil to a processing unit.

According to an embodiment of the present disclosure, a pupil positioning device implemented based on hardware is provided. By preprocessing an eye image during data transmission, the device can not only avoid frame buffer, thereby saving storage resources, but also obtain all boundary points of the eye image at one time during the data transmission. Thereafter, the device determines coordinates of a center of the pupil based on all the boundary points by using a hardware based connected area processing method, which can avoid the large amount of data operation that may cause a delay, increase the processing speed, shorten the processing time and save logic resources, thereby solving the existing pupil positioning technology that involves a high producing cost and slow processing. The preprocessing circuit and the coordinate processing circuit according to the embodiments of the present disclosure utilize few storage resources and logic resources, thereby facilitating hardware implementation and integration in a display driver of a head mounted virtual reality device, and support the real time collection and real time processing of the 120 Hz camera apparatus, thereby achieving mapping of coordinates of the center of the $N^{th}$ frame pupil to the $N+1^{th}$ frame.

Figure 2:
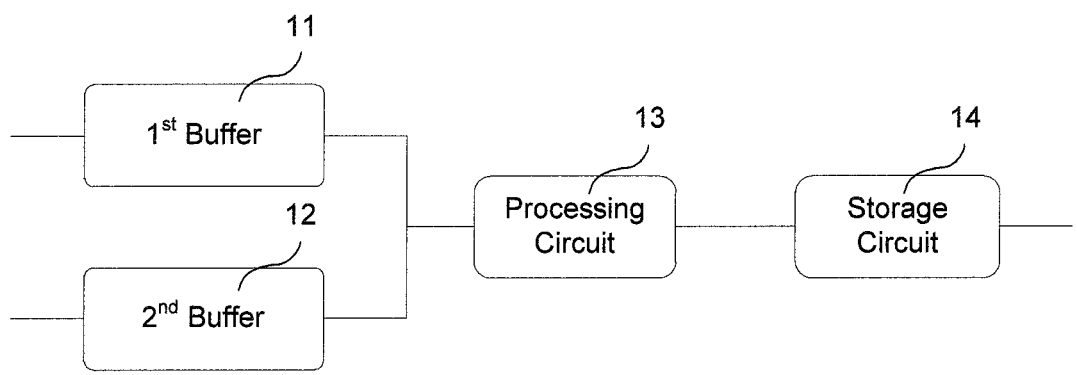
FIG. 2 is a schematic diagram showing a structure of a preprocessing circuit according to an embodiment of the present disclosure.

FIG. 2 is a schematic diagram showing a structure of a preprocessing circuit according to an embodiment of the present disclosure. As shown in FIG. 2, the preprocessing circuit implemented based on hardware includes a first buffer 11, a second buffer 12, a processing circuit 13, and a storage circuit 14. The first buffer 11 and the second buffer 12 are connected to a camera apparatus (shown in FIG. 1) which captures an eye picture. The processing circuit 13 is connected to the first buffer 11 and to the second buffer 12, respectively. The storage circuit 14 is connected to the processing circuit 13. The first buffer 11 is configured to buffer the $i^{th}$ row of data in the eye image transmitted from a camera apparatus that captures the eye image during the $i^{th}$ buffer period, and transmit the $i^{th}$ row of data to the processing circuit 13 during the $i+1^{th}$ buffer period. The second buffer 12 is configured to buffer the $i+1^{th}$ row of data in the eye image transmitted from the camera apparatus during the $i+1^{th}$ buffer period, and transmit the $i+1^{th}$ row of data to the processing circuit 13 during the $i+2^{th}$ buffer period. The processing circuit 13 is configured to preprocess the data, and obtain and transmit boundary points of the data to the storage circuit 14. The storage circuit 14 is configured to store all the boundary points of the eye image. Herein, $i=1, \ldots, N-1$, and N is the number of pixel rows in the eye image.

According to an embodiment of the present disclosure, both the first buffer 11 and the second buffer 12 may be a dual-port random access memory (RAM). Two RAMs may buffer odd-numbered rows of data and even-numbered rows of data, respectively, for a ping-pond operation. The processing circuit 13 may either be a circuit composed of a RAM read-write controller, a comparator and a counter, or a corresponding integrated circuit such as a field programmable gate array (FPGA). The storage circuit 14 may be a single port RAM or a dual port RAM. According to the prior art, a camera apparatus installed in front of an eye captures an eye image in real time, and thereafter data on the image is sent to an image capturing card, which in turn transmits the data to a processing unit (such as of a computer device) to form the entire frame for subsequent processing. According to the embodiments of the present disclosure, preprocessing of the eye image is configured to occur during data transmission of the eye image after collecting the eye image, i.e., transmission from a camera apparatus which captures the eye image to a processing unit which processes the eye image for other usage. For the image data stream transmitted from the camera apparatus in real time, both the first buffer 11 and the second buffer 12 buffer only one row of data and the row of data is then processed by the processing circuit 13. The processing is delayed by one row and a small amount of data on boundary points can be obtained, thereby minimizing the data amount and laying a good foundation for improving the speed of subsequent processing and reducing the subsequent processing time. As a commonly used processing manner in data flow control, a Ping-Pong operation is used, in which data is buffered and sent to the subsequent circuit for computing, under the switching control of a RAM read and write controller. The corresponding implementations are known to those skilled in the art, and details thereof will not be described here.

Figure 3:
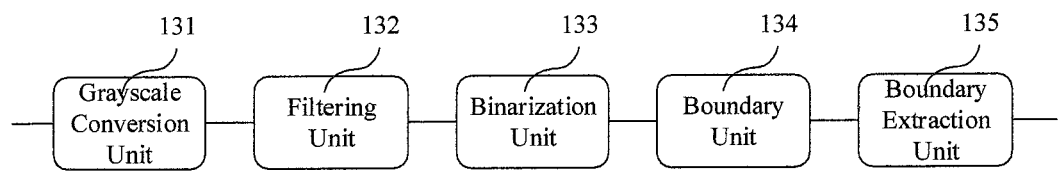
FIG. 3 is a schematic diagram showing a structure of a processing circuit according to an embodiment of the present disclosure.

FIG. 3 is a schematic diagram showing a structure of a processing circuit according to an embodiment of the present disclosure. As shown in FIG. 3, the processing circuit includes a grayscale conversion unit 131, a filtering unit 132, a binarization unit 133, a boundary unit 134, and a boundary extraction unit 135, which are connected in sequence. The grayscale conversion unit 131 is configured to perform grayscale conversion processing on data sent from the first buffer 11 or the second buffer 12. The filtering unit 132 is configured to perform filtering processing on the data after the grayscale conversion processing by the grayscale conversion unit 131. The binarization unit 133 is configured to perform binarization processing on the data after the filtering processing by the filtering unit 132. The boundary unit 134 is configured to perform boundary erosion and dilation processing on the data after the binarization processing by the binarization unit 133. The boundary extraction unit 135 is configured to perform boundary extraction processing on the data after the boundary erosion and dilation processing by the boundary unit 134.

Figures 4, 5, 6:
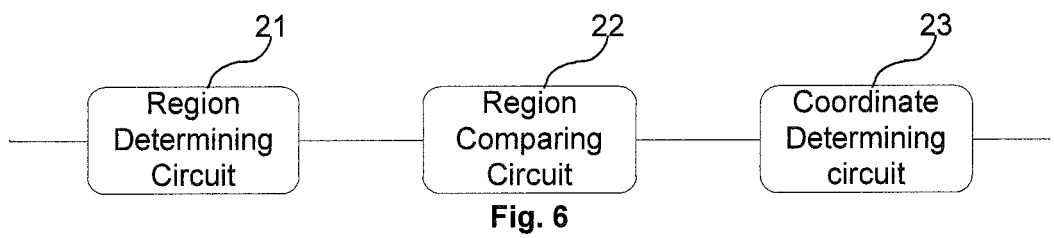
FIG. 4 is a schematic diagram showing a 3*3 template for Gaussian filtering according to an embodiment of the present disclosure.
FIG. 5 is a schematic diagram showing a four-neighborhood method according to an embodiment of the present disclosure.
FIG. 6 is a schematic diagram showing a structure of a coordinate processing circuit according to an embodiment of the present disclosure.

In order to minimizing the data amount and improve the processing speed, first of all, the grayscale conversion unit 131 performs grayscale conversion on a color image collected by the camera apparatus to convert RGB image data into 8-bit gray image data. Subsequently, the filtering unit 132 performs the filtering processing on the grayscale image data to remove noise in the image. In an embodiment of the present disclosure, the filtering processing may use Gaussian filtering to remove Gaussian noise in the image. Gaussian filtering is a kind of linear smoothing filtering, which performs weighted averaging on the image. The grayscale value of each pixel is obtained as a weighted average of the grayscale values of itself and other pixels in the neighborhood. FIG. 4 is a schematic diagram showing a 3*3 template for Gaussian filtering according to an embodiment of the present disclosure. As shown in FIG. 4, the Gaussian filtering can be implemented by means of 3*3, that is, each pixel in the image is scanned with a 3*3 template, and a grayscale value of a pixel in the center of the template is substituted by the weighted averaged grayscale value of the pixels in the neighborhood determined by the template. In the practice, a variety of ways may be used to achieve the Gaussian filtering. For example, two RAMs respectively buffer the $i^{th}$ row of data and the $i+1^{th}$ row of data of the eye image. When the $i+2^{th}$ row of data arrives, three registers are used to buffer data of the first three pixel points in the $i+2^{th}$ row of data, and at the same time the first three pixel points of the $i^{th}$ row of data and the $i+1^{th}$ row of data are read, respectively, from the two RAMs, so as to form a 3*3 template. After one pixel point is processed, a pixel point is read out from each of the two RAMs to form another 3*3 template with new pixel points in the $i+2^{th}$ row of data, until the entire frame image is traversed. The above processing in the embodiments of the present disclosure only needs to buffer two rows of data, thus occupying very few resources.

After the processing by the grayscale conversion unit 131 and the filtering unit 132, the binarization unit 133 performs binarization processing on the processed data. The nature of the binarization processing is to process an 8-bit image of 256 grayscales into an image of only two grayscales, 0 or 255, that is to convert a grayscale image into a black-and-white image. In an embodiment, the binarization processing includes: traversing each pixel of row data to compare a grayscale value of each pixel with a preset grayscale threshold; if the grayscale value of the pixel is greater than or equal to the grayscale threshold, setting the gray value of the pixel to 0; and if the gray value of the pixel is less than the gray threshold, setting the gray value of the pixel to 1, so as to obtain a binarized image. The binarization processing can not only simplify the image, thereby highlighting outline of the pupil, but also reduce the data amount, thereby facilitating the subsequent processing of the image. By setting the grayscale threshold, all the pixels having grayscale values less than the grayscale threshold may be determined as the pupil region, and the corresponding grayscale values are set to 1 and then outputted for buffering. The remaining pixels may be determined as outside the pupil region, and the corresponding grayscale values are set to 0 and then outputted for buffering. Thus, after the binarization processing, two rows of 1-bit data can be obtained, which involves a very small cache. In the actual implementation, any well-known binarization algorithm may be adopted, and the grayscale threshold may be preset according to the entire and local features of the image.

After the processing by the binarization unit 133, the boundary unit 134 performs boundary erosion and dilation processing on the binarized data to clarify the boundaries, resulting in binarized data with sharp boundaries. The erosion and dilation of a binarized image, also known as opening operations, can eliminate small objects, and separate objects at slender parts and smooth boundaries of the larger objects. Specifically, it is to move a preset template on a per point basis on the eye image, perform comparisons, and make appropriate processing based on results of the comparisons. In the erosion processing, for a pixel point in the eye image, if all the black pixel points in the preset template are exactly the same as pixel points in the corresponding eye image, the pixel point is black, otherwise it is white. In the dilation processing, for a pixel point in the eye image, if there are one or more black pixel points in the preset template the same as pixel points in the corresponding eye image, the pixel is black, otherwise it is white. That is to say, for a pixel point in the eye image, if none of the black pixel points in the preset template is the same as the pixel points in the corresponding eye image, the pixel is white, otherwise it is black. None of the black pixel points in the preset template being the same as the pixel points in the corresponding eye image means that all the pixel points in the eye image are white. If a skeleton of a binary map is white, dilation processing of a binary map having a black skeleton happens to be erosion processing of the binary map of the white skeleton. In the actual implementation, other well-known boundary erosion and dilation algorithms may be used, and details thereof will not be described herein again.

After the processing by the boundary unit 134, the boundary extraction unit 135 performs boundary extraction on the binarized data having sharp boundaries to obtain boundary points in the image. In an embodiment of the present disclosure, the boundary extraction is performed by using a four-neighborhood method. FIG. 5 is a schematic diagram showing a four-neighborhood method according to an embodiment of the present disclosure. As shown in FIG. 5, the basic principle of the four-neighborhood method is that for a selected pixel point A, four neighboring pixel points are pixel point 1 on its upper side, pixel point 2 on its lower side, pixel point 3 on its left side and pixel point 4 on its right side, respectively, whereby connectivity among the neighboring pixels can be defined, that is, whether or not the pixel points are connected to each other. The connectivity may be defined in such a manner that in a pixel row or column, if grayscale values of all the pixels are the same (0 or 1) and the pixels are adjacent in order, then there is a connection between any two pixel points in the pixel column, otherwise there is no connection between the two pixel points. Specifically, it is to firstly select a pixel point A with a grayscale value of 1, and determine grayscale values of its four neighboring pixel points, i.e., pixel point 1 on its upper side, pixel point 2 on its lower side, pixel point 3 on its left side and pixel point 4 on its right side. If at least one of the four grayscale values is 0, it is determined that pixel point A is a boundary pixel point, otherwise it is not a boundary pixel point. After traversing all the pixel points, all pixels that are boundary points may be obtained, and then the grayscale value of each pixel point that is not a boundary point may be set to 0 and the processed data may be stored in the storage circuit. In the actual implementation, two dual-port RAMs may be used to buffer odd rows and even rows, respectively, and a Ping-Pong operation is performed on the binary data in combination with registers.

In practice, the processing circuit may further include a clipping unit for performing clipping processing before the grayscale conversion on the eye image. With the clipping, eyelashes, wrinkles in eyelids, eyelids and the like can be clipped from the eye image, and white eyeballs, black eyeballs, pupils and the other useful parts can be cut out, thereby reducing data amount of the basic image. In the actual implementation, this may be achieved by means of stream processing on transmission of data streams.

It can be seen from the above description that, instead of buffering a frame, the preprocessing circuit according to the embodiments of the present disclosure only needs to buffer two rows of data. During data transmission, all pixel points of the eye image are traversed. With determination and calculation, all boundary points of the pupil and noise can be extracted from the eye image once for all and the processing result can be outputted in real time. It can be implemented with few storage and logical resources. When compared with the conventional scheme in which the entire frame of image is buffered and traversed, the embodiments of the present disclosure reduce the amount of data in data transmission to as much as possible, improve the processing speed, reduce the resource occupation and allow for increased processing speed and reduced processing time in subsequent operations.

FIG. 6 is a schematic diagram showing a structure of a coordinate processing circuit according to an embodiment of the present disclosure. In order to reduce storage resources and logical resources while solving the delay problem, an embodiment of the present disclosure provides a connected region processing scheme implemented in hardware, which involves processing time less than 1 ms and can be completed within a blanking period during which a camera apparatus outputs an eye image, without occupying any valid data transmission period. As shown in FIG. 6, a coordinate processing system implemented in hardware includes a region determining circuit 21, a region comparing circuit 22, and a coordinate determining circuit 23, which are connected in sequence. The region determining circuit 21 is connected to the storage circuit of the preprocessing circuit, and is configured to determine all the connected regions according to all the boundary points of the eye image. The region comparing circuit 22 is configured to compare sizes of all the connected regions to determine the maximum connected region. The coordinate determining circuit 23 is configured to determine the coordinates of the center of the pupil according to the maximum connected region. Each of the region determining circuit 21, the region comparing circuit 22 and the coordinate determining circuit 23 may be either implemented by a hardware circuit formed of devices such as a RAM read-write controller, a comparator and a counter, or by using an FPGA.

In an embodiment, the region determining circuit 21 is configured to read the preprocessed data from the storage circuit of the preprocessing circuit, determine all the connected regions by using an eight-neighborhood method, and store coordinates of boundary points of all the connected regions. FIG. 7 is a schematic diagram showing an eight-neighborhood method according to an embodiment of the present disclosure. The eight-neighborhood method is a kind of contour tracking method, which tracks boundaries by sequentially finding boundary points, that is to classify all the boundary points, so that all the connected regions can be identified. As shown in FIG. 7, for a selected pixel point A, its eight neighboring pixel points are pixel point 1 on its left side, pixel point 2 on its lower left side, pixel point 3 on its lower right side, pixel point 4 on its lower right side, pixel pint on its right side, pixel point 6 on its upper right side, pixel point 7 on its upper right side, and pixel point 8 on its upper left side. Since the storage circuit of the preprocessing circuit stores binarized data after boundary extraction, the connected region processing only needs to process the boundary points. The processing flow is described as follows. First, each pixel is read out from the storage circuit by address to find the first boundary point (a pixel point with a grayscale value of 1) of each connected region, which is marked as boundary point A0, and then the eight-neighborhood method is used to sequentially determine grayscale values of pixel point 1, pixel point 2, pixel point 3, pixel point 4, pixel point 5, pixel point 6, pixel point 7, and pixel point 8. If it is determined that a pixel point (e.g., pixel point 3) has a grayscale value of 1, then the pixel point is a new boundary point, which is marked as boundary point A1. It is jumped to boundary point A1 to repeatedly use the eight-neighborhood method to make the subsequent determination, so as to sequentially find boundary points A2 . . . An. If An is equal to boundary point A1 and the former boundary point An−1 is equal to boundary point A0, this indicates that one round has been made. Then, the processing is stopped and the boundary tracking ends. The boundary points A0, A1, A2, . . . , An−2 form a boundary of a connected region. During the processing, coordinates of each boundary point of the connected region is stored.

FIG. 8 is a schematic diagram showing a structure of a region comparing circuit according to an embodiment of the present disclosure. As shown in FIG. 8, a region comparing circuit implemented in hardware includes a first buffer 221, a second buffer 222, a comparing and controlling unit 223, and a storage unit 224. The first buffer 221 and the second buffer 222 are connected to the region determining circuit 21, and also connected to the comparing and controlling unit 223. The comparing and controlling unit 223 is connected to the storage unit 224. The first buffer 221 is configured to read, from the region determining circuit 21, coordinates of boundary points of the $j^{th}$ connected region, and count the number Mj of the coordinates of the boundary points of the $j^{th}$ connected region. The second buffer 222 is configured to read, from the region determining circuit, coordinates of boundary points of the $j+1^{th}$ connected region, and count the number Mj+1 of the coordinates of the boundary points of the $j+1^{th}$ connected region, wherein j=1, . . . , M−1, and M is the number of the connected regions. The comparing and controlling unit 223 is configured to compare Mj and Mj+1. When Mj<Mj+1, which means that the connected region read by the first buffer 221 is smaller, the first buffer 221 is controlled to read coordinates of boundary points of another connected region and obtain the number of coordinates of boundary points of the other connected region, and the comparing and controlling unit 223 compares sizes of the connected regions. When Mj>Mj+1, which means that the connected region read by the second buffer 222 is smaller, the second buffer is controlled to read the coordinates of the boundary points of another connect region and obtain the number of coordinates of boundary points of the other connected region, and the comparing and controlling unit 223 compares sizes of the connected regions; and so on, until all the connected regions are traversed. Then, a connected region having the largest number of coordinates of boundaries points is the maximum connected region. The comparing and controlling unit 223 sends coordinates of boundary points of the maximum connected region to the storage unit 224, which in turn stores coordinates of boundary points of the maximum connected region.

Since the above processing according to the embodiments of the present disclosure only needs to store boundary points of connected regions, which leads to the data amount of about 100 kbits to 200 kbits, the data processing amount is small, the processing speed is fast, and the processing time is less than 1 ms. In practice, the processing time is mainly used for controlling reading and writing of RAM. In the actual implementation, multiple RAMs can be applied to perform reading and writing at the same time, so as to further shorten the processing time. It is possible to control the processing time to be in the order of several hundred microseconds. In the meantime, the above processing according to the embodiments of the present disclosure may use hardware composed of a RAM read-write controller, a comparator and a counter, etc., which results in using very few logic resources.

FIG. 9 a schematic diagram showing a structure of a coordinate determining circuit according to an embodiment of the present disclosure. As shown in FIG. 9, the coordinate determining circuit implemented in hardware includes a reading unit 231, a diameter determining unit 232 and a coordinate determining unit 233. The reading unit 231 is connected to the storage unit of the region comparing circuit and configured to read, from the storage unit of the region comparing circuit, the coordinates of the boundary points of the maximum connected region.

The diameter determining unit 232 is connected to the reading unit 231, configured to traverse coordinates of all the boundary points to obtain the minimum abscissa, the maximum abscissa, the minimum ordinate and the maximum ordinate, and configured to determine a double diameter of the maximum connected region. The coordinate determining unit 233 is connected to the reading unit 231 and configured to select P boundary points from all the boundary points and determine the coordinates of the center of the maximum connected region by using an ellipse fitting method as the coordinates of the center of the pupil, wherein P=6, 7, 8, 9 or 10.

The ellipse filling algorithm is to fit an outer contour of a connected region based on the principle of Least Square. In a two-dimensional coordinate system, an ellipse may be expressed by the following formula:

$$Ax^2 + By^2 + Cxy + Dx + Ey + F = 0$$

$$x_c = \frac{BE - 2CD}{4AC - B^2}$$

$$y_c = \frac{BD - 2AE}{4AC - B^2},$$

wherein x and y are horizontal and ordinates of a boundary point, $x_c$ and $y_c$ are horizontal and ordinates of a center position of the ellipse, A, B, C, D and E are parameters of the ellipse, and F is a constant term. The processing flow of the ellipse fitting algorithm will be described as follows. First of all, 6 points are selected to get 6 equations for solving the parameters A, B, C, D, E and F of the ellipse. If the equations have solutions that meet certain constraints, coordinates of the center of the ellipse can be calculated by using the parameters of the ellipse. The algorithm is well known to those skilled in the art and will not be repeated here. In the embodiment of the present disclosure, 6 to 10 boundary points of the maximum connected region may be selected for processing. Specifically, the diameter determining unit 232 sequentially reads coordinates of the boundary points from the reading unit 231, compares every two coordinates to obtain four pixel points having the minimum abscissa, the maximum abscissa, the minimum ordinate and the maximum ordinate, and then determines the double diameter of the maximum connected region based on the coordinates of the four contour points of the ellipse. The coordinate determining unit 233 sequentially reads the coordinates of the boundary points from the reading unit 231, counts the numbers S of coordinates all the boundary points, selects, starting from a boundary point, one boundary point every [S/P] boundary points, solves the parameters of the ellipse based on the coordinates of the P boundary points by using the ellipse fitting method, and determines the coordinates of the center of the maximum connected region based on coordinates of the parameters of the ellipse, as the coordinates of the center of the pupil.

In the actual implementation, the four contour points or the double diameter of the ellipse obtained by the diameter determining unit may be used as the constraints for determining the parameters of the ellipse. It is also possible not to provide the diameter determining unit, that is, no processing of contour points of the ellipse is performed, but instead 8 to 10 boundary points are processed. In an embodiment, six boundary points are firstly selected for solving the parameters of the ellipse. If the equation has a solution that meets the constraints, the solution is added to the parameter space for accumulation. Then, the same operation is repeated on another combination of six points. Finally, the median value of the accumulated parameters is used as the finally estimated value.

It can be seen from the foregoing introduction that the coordinate processing circuit according to the embodiments of the present disclosure can be implemented by using very few storage resources and logic resources (e.g., a RAM read-write controller, a comparator, and a counter). This can lead to the small data amount of about 100 kbits to 200 kbits, without requiring a large storage space. Moreover, the algorithm is simple, the processing speed is fast, and thus the processing time is less than 1 ms. When a camera apparatus samples an eye image at 120 Hz in real time, the coordinates of the center of the pupil at the $N^{th}$ frame can be mapped to the $N+1^{th}$ frame. Further, the coordinate processing circuit according to the embodiments of the present disclosure uses very few logic resources, and the hardware implementation has the advantages of a low producing cost and small power consumption and is easy to be integrated in a display driver of a head mounted virtual reality device.

Figure 10:
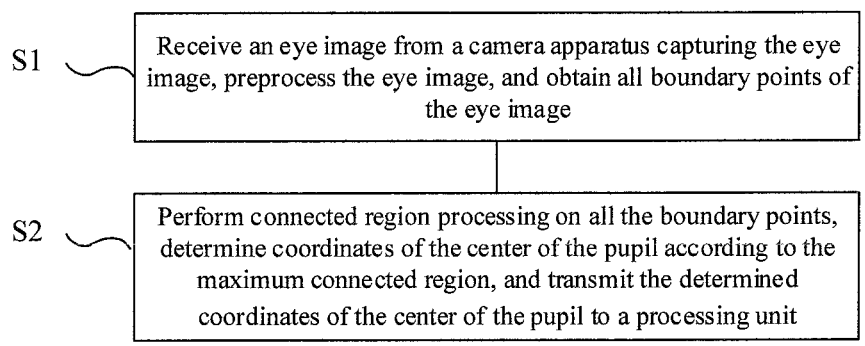
FIG. 10 is a flowchart of a pupil positioning method according to an embodiment of the present disclosure.

Based on the technical concept as mentioned above, an embodiment of the present disclosure further provides a pupil positioning method. FIG. 10 is a flowchart of a pupil positioning method according to an embodiment of the present disclosure. As shown in FIG. 10, the pupil positioning method includes the following steps:

S1, receiving an eye image for example from a camera apparatus which captures the eye image, and preprocessing the eye image to obtain all boundary points of the eye image; and S2, performing connected region processing on all the boundary points, and determining coordinates of the center of the pupil according to the maximum connected region.

The step S1 includes buffering two rows of data in the eye image transmitted from the camera apparatus by using two dual-port random access memory RAMs, respectively, and preprocessing the data by means of a ping-pong operation to obtain all the boundary points of the eye image.

The preprocessing the data includes: grayscale conversion processing, filtering processing, binarization processing, boundary erosion and dilation processing, and boundary extraction processing.

The preprocessing the data further includes clipping the eye image.

The step S2 includes:

S21, determining all the connected regions according to all the boundary points of the eye image by using an eight-neighborhood method;

S22, comparing sizes of all the connected regions to determine the maximum connected region; and S23, determining the coordinates of the center of the pupil according to the maximum connected region.

The step S22 includes: reading coordinates of boundary points of two connected regions by using two dual-port random access memory RAMs, respectively, and counting and comparing the numbers of the coordinates of the boundary points of the two connected regions; controlling the RAM having the smaller number of coordinates of boundary points to read coordinates of boundary points of another connected region and performing the comparing again until all the connected regions are traversed, and determining a connected region having the largest number of coordinates of boundary points as the maximum connected region.

The step S23 includes:

S231, reading coordinates of boundary points of the maximum connected region in sequence, comparing every two coordinates to obtain the minimum abscissa, the maximum abscissa, the minimum ordinate and the maximum ordinate, and determining a double diameter of the maximum connected region; and S232, selecting P boundary points from all the boundary points, and determining the coordinates of the center of the maximum connected region by using an ellipse fitting method as the coordinates of the center of the pupil, wherein P=6, 7, 8, 9 or 10.

The step of selecting P boundary points from all the boundary points includes:

counting the number S of the coordinates of all the boundary points, and selecting, starting from a boundary point, one boundary point every [S/P] boundary points.

Please refer to the descriptions on the pupil positioning device for the grayscale conversion, the filtering, the binarization processing, the boundary erosion and dilation processing, the boundary extraction processing, the determining of the maximum connected region, the determining the coordinates of the center of the pupil, and the like processing, and the details thereof will not be described here.

Based on the technical concept as mentioned above, an embodiment of the present disclosure further provides a display driver of a head-mounted virtual reality device, which include the pupil positioning device as mentioned above. Generally, the main structure of the head-mounted virtual reality device includes a wearing body, a display device disposed in the wearing body, and a camera apparatus. The display device includes one or more display screens and a display driver. In an embodiment of the present disclosure, the pupil positioning device is integrated in the display driver, and the camera apparatus collects an eye image of the user and sends the eye image to the pupil positioning device. The pupil positioning device obtains the coordinates of the center of the pupil through the image processing and sends it to the processing unit, which in turn calculates the position at which the eye's current sight falls on the display screen according to coordinates of the purkinje image and further operates the display screen, thereby realizing functions such as human-computer interaction or gaze point rendering.

It is to be understood, in the description of the embodiments of the present disclosure, the terms "middle", "upper", "lower", "front", "rear", "vertical", "horizontal", "top", "bottom", "inside", "outside" and the like refer to the orientation or positional relationships based on those as shown in the drawings, which are merely for facilitating and simplifying the description, rather than indicating or implying that the indicated device or element must have a specific orientation and is configured and operated in a specific orientation, and thus cannot be understood as a limitation of the present disclosure.

In the description of the embodiments of the present disclosure, it should be noted that unless explicitly defined otherwise, the terms "installed," "connected," and "connecting" should be broadly understood, e.g., as permanently connected, detachably connected or integrally connected, or as mechanically connected or electrically connected, or as directly connected or indirectly connected through an intermediary medium, or as the internal communication between two components. For those skilled in the art, the specific meanings of the above terms in the present disclosure may be understood depending on specific cases.

Those skilled in the art should understand that the embodiments of the present disclosure may be provided as a method, a system, or a computer program product. Accordingly, the present disclosure may be implemented in the form of a pure hardware embodiment, a pure software embodiment, or an embodiment combining software and hardware.

While the present disclosure has been explained in detail with reference to the above embodiments, the contents as mentioned merely are intended to facilitate understanding of the embodiments, other than limiting the present disclosure. Any modification and variation can be made to the forms and details of the implementations, without departing from the spirit and scope of the present disclosure. The scope of the present disclosure is subject to that defined by the appended claims.

The invention claimed is:

1. A pupil positioning device, comprising:
a preprocessing circuit configured to receive an eye image, preprocess the eye image to obtain all boundary points of the eye image so as to reduce an amount of data of the eye image; and
a coordinate processing circuit configured to perform connected region processing on all the boundary points, and determine coordinates of a center of the pupil according to the maximum connected region,
wherein the preprocessing circuit comprises:
a first buffer configured to buffer the $i^{th}$ row of data in the eye image during the $i^{th}$ buffer period, and transmit the $i^{th}$ row of data to a processing circuit during the $i+1^{th}$ buffer period, wherein $i=1^{th}$ . . . , N−1, and N is the number of pixel rows in the eye image;
a second buffer configured to buffer the $i+1^{th}$ row of data in the eye image during the $i+1^{th}$ buffer period, and transmit the $i+1^{th}$ row of data to the processing circuit during the $i+2^{th}$ buffer period;
the processing circuit configured to the preprocess the data, and obtain and transmit boundary points of the data to a storage circuit; and
the storage circuit configured to store all the boundary points of the eye image, and
wherein the processing circuit comprises:
a grayscale conversion unit for performing grayscale conversion processing on the data;
a filtering unit for performing filtering processing on the data after the grayscale conversion processing;
a binarization unit for performing binarization processing on the data after the filtering processing;
a boundary unit for performing boundary erosion and dilation processing on the data after the binarization processing; and
a boundary extraction unit for performing boundary extraction processing on the data after the boundary erosion and dilation processing.

2. The pupil positioning device according to claim 1, wherein the first buffer module and the second buffer each comprises a dual-port random access memory RAM, and the processing circuit comprises a circuit composed of a RAM read-write controller, a comparator and a counter or comprises a field programmable gate array FPGA.

3. The pupil positioning device according to claim 1, wherein the filtering unit performs Gaussian filtering by using a 3*3 template, and the boundary extraction unit performs the boundary extraction by using a four-neighborhood method.

4. The pupil positioning device according to claim 1, wherein the processing circuit further comprises a clipping unit for clipping the eye image.

5. The pupil positioning device according to claim 1, wherein the coordinate processing circuit comprises:
a region determining circuit for determining all the connected regions according to all the boundary points of the eye image;
a region comparing circuit for comparing sizes of all the connected regions to determine the maximum connected region; and
a coordinate determining circuit for determining the coordinates of the center of the pupil according to the maximum connected region.

6. The pupil positioning device according to claim 5, wherein the region determining circuit is adapted to read all the boundary points from the preprocessing circuit, determine all the connected regions by using an eight-neighborhood method, and store coordinates of boundary points of all the connected regions.

7. The pupil positioning device according to claim 5, wherein the region comparing circuit comprises:
a first buffer for reading, from the region determining circuit, coordinates of boundary points of the $j^{th}$ connected region, and counting the number Mj of the coordinates of the boundary points of the $j^{th}$ connected region, wherein j=1, . . . , M−1, and M is the number of the connected regions;
a second buffer for reading, from the region determining circuit, coordinates of boundary points of the $j+1^{th}$ connected region, and counting the number Mj+1 of the coordinates of the boundary points of the $j+1^{th}$ connected region;
a comparing and controlling unit for comparing Mj and Mj+1; when Mj<Mj+1, controlling the first buffer to read the coordinates of the boundary points of another connected region and performing the comparing again; and when Mj>Mj+1, controlling the second buffer to read the coordinates of the boundary points of another connected region and performing the comparing again; and
a storage unit for storing coordinates of boundary points of the maximum connected region output by the comparing and controlling unit.

8. The pupil positioning device according to claim 5, wherein the coordinate determining circuit comprises:
a reading unit for reading, from the region comparing circuit, the coordinates of the boundary points of the maximum connected region;
a diameter determining unit for traversing coordinates of all the boundary points to obtain the minimum abscissa, the maximum abscissa, the minimum ordinate and the maximum ordinate, and determining a double diameter of the maximum connected region; and
a coordinate determining unit for selecting P boundary points from all the boundary points, and determining the coordinates of a center of the maximum connected region by using an ellipse fitting method as the coordinates of the center of the pupil, wherein P=6, 7, 8, 9 or 10.

9. The pupil positioning device according to claim 8, wherein the coordinate determining unit is adapted to count the number S of the coordinates of all the boundary points, select, starting from a boundary point, one boundary point every [S/P] boundary points, and determine the coordinates of the center of the maximum connected region based on coordinates of the P boundary points by using the ellipse fitting method, as the coordinates of the center of the pupil.

10. A display driver of a virtual reality device, comprising the pupil positioning device according to claim 1.

11. A pupil positioning method, comprising:
receiving an eye image, and preprocessing the eye image to obtain all boundary points of the eye image so as to reduce an amount of data to be processed, comprising buffering two rows of data in the eye image by using two dual-port random access memory RAMs, respectively, and preprocessing the data by means of a ping-pong operation to obtain al the boundary points of the eye image; and performing connected region processing on all the boundary points, and determining coordinates of a center of the pupil according to the maximum connected region, wherein preprocessing the data comprises:
grayscale conversion processing, filtering processing, binarization processing, boundary erosion and dilation processing, and boundary extraction processing.

12. The pupil positioning method according to claim 11, wherein said preprocessing the data further comprises clipping the eye image.

13. The pupil positioning method according to claim 11, wherein said performing connected region processing on all the boundary points and determining coordinates of the center of the pupil according to the maximum connected region comprises:
determining all the connected regions according to all the boundary points of the eye image by using an eight-neighborhood method;
comparing sizes of all the connected regions to determine the maximum connected region; and
determining the coordinates of the center of the pupil according to the maximum connected region.

14. The pupil positioning method according to claim 13, wherein said comparing sizes of all the connected regions to determine the maximum connected region comprises:
reading coordinates of boundary points of two connected regions by using two dual-port random access memory RAMs, respectively, and counting and comparing the numbers of the coordinates of the boundary points of the two connected regions; controlling the RAM having the smaller number of coordinates of boundary points to read coordinates of boundary points of another connected region and performing the comparing again until all the connected regions are traversed, and determining a connected region having the largest number of coordinates of boundary points as the maximum connected region.

15. The pupil positioning method according to claim 13, wherein said determining the coordinates of the center of the pupil according to the maximum connected region comprises:
reading coordinates of boundary points of the maximum connected region in sequence, comparing every two coordinates to obtain the minimum abscissa, the maximum abscissa, the minimum ordinate and the maximum ordinate, and determining a double diameter of the maximum connected region; and
selecting P boundary points from all the boundary points, and determining the coordinates of a center of the maximum connected region by using an ellipse fitting method as the coordinates of the center of the pupil, wherein P=6, 7, 8, 9 or 10.

16. The pupil positioning method according to claim 15, wherein said selecting P boundary points from all the boundary points comprises:
counting the number S of the coordinates of all the boundary points, and selecting, starting from a boundary point, one boundary point every [S/P] boundary points.

* * * * *